United States Patent
Scott et al.

(10) Patent No.: US 6,357,216 B1
(45) Date of Patent: Mar. 19, 2002

(54) FLASHBACK CONTROL FOR A GAS TURBINE ENGINE COMBUSTOR HAVING AN AIR BYPASS SYSTEM

(75) Inventors: Michael W. Scott, Chandler; Bruce S. Anson, Scottsdale; Ian L. Critchley, Phoenix, all of AZ (US); Lorenzo Hernandez, Mahuma (AW)

(73) Assignee: Honeywell International, Inc., Morris Township, NJ (US)

( * ) Notice: Subject to any disclaimer, the term of this patent is extended or adjusted under 35 U.S.C. 154(b) by 0 days.

(21) Appl. No.: 09/671,930

(22) Filed: Sep. 27, 2000

(51) Int. Cl.$^7$ ................................................ F02C 9/16
(52) U.S. Cl. .................. 60/39.02; 60/39.091; 60/39.23
(58) Field of Search ........................... 60/39.03, 39.091, 60/39.11, 39.23; 431/22, 80, 346

(56) References Cited

U.S. PATENT DOCUMENTS

| | | | |
|---|---|---|---|
| 3,635,018 A | 1/1972 | De Corso et al. | |
| 3,701,137 A | 10/1972 | Hulsman | |
| 4,094,142 A | * 6/1978 | Pfefferle | .................. 60/39.23 |
| 4,115,998 A | 9/1978 | Gilbert et al. | |
| 4,122,667 A | * 10/1978 | Hosaka et al. | .......... 60/39.091 |
| 4,138,842 A | 2/1979 | Zwick | |
| 4,959,638 A | 9/1990 | Palmer | |
| 5,073,104 A | 12/1991 | Kemlo | |
| 5,148,667 A | 9/1992 | Morey | |
| 5,397,181 A | 3/1995 | McNulty | |
| 5,613,357 A | * 3/1997 | Mowill | ...................... 60/39.23 |
| 5,857,320 A | 1/1999 | Amos et al. | |
| 6,070,406 A | 6/2000 | Lenertz et al. | |
| 6,135,760 A | * 10/2000 | Cusack et al. | ............. 60/39.03 |
| 6,210,152 B1 | * 4/2001 | Haffner et al. | ................. 431/22 |

* cited by examiner

Primary Examiner—Ted Kim
(74) Attorney, Agent, or Firm—Robert Desmond, Esq.

(57) ABSTRACT

A control and method for arresting flashback in a gas turbine engine combustion system having a venturi for delivering a mixture of air and fuel to a combustion chamber and a valve for controlling the amount of air flowing to the venturi. The control and method includes a flashback detection routine, a valve position trim routine, and a reference flame temperature adjustment routine. The flashback detection routine detects a flashback in the venturi by comparing the temperature at the venturi to the temperature of the air entering the valve. The valve position trim routine receives this flashback signal and in response causes the valve to open until the flashback is arrested. Finally, to prevent the flashback from recurring, the reference flame temperature adjustment routine adjusts a reference flame temperature in the control system so as to prevent the valve from returning to the position at which the flashback occurred.

18 Claims, 3 Drawing Sheets

FLASHBACK CONTROL FOR A GAS TURBINE ENGINE COMBUSTOR HAVING AN AIR BYPASS SYSTEM

TECHNICAL FIELD

This invention relates generally to control systems for combustors in gas turbine engines having air bypass systems and in particular to a control system that arrests flashback in such combustors.

BACKGROUND OF THE INVENTION

Lenertz et al. U.S. Pat. No. 6,070,406 entitled "Combustor Dilution Bypass System" discloses a combustor having two combustion systems generally denoted by the letters A and B as shown in FIG. 1. Each of these systems includes an air bypass system having a valve 12 with an inlet port 16, and two exit ports 18 and 20. Inlet port 16 is connected to an inlet duct 17 for receiving compressed air from the combustor plenum 19 that circumscribes the combustion chamber 60 which is defined by a combustor wall 62. Exit port 18 connects to the premixer duct 22 which leads to the premixer injector 64 that injects tangentially a mixture of fuel and air into the combustion chamber 60. The injector 64 has a fuel nozzle 66, a venturi 70, a premix chamber 68 and an igniter 72. In operation, the fuel nozzle injects a fuel-air mixture into the premix chamber 68. In the premix chamber additional air is added through premixer duct 22. The igniter 72 ignites this mixture during engine starting creating a hot gas 74 that flows into and around the combustion chamber 60. The second exit port 20 connects to the bypass duct 24. The valve 12 includes a rotatable valve rotor 26 for selectively controlling the relative proportions of airflow to premixer duct 22 and bypass duct 24. The position of the rotor 26 is controlled by an electronic unit for the gas turbine engine in which these combustion systems are deployed.

Flashback involves the flame from the combustion chamber 60 being drawn back into the venturi 70 and premix chamber 68 and may be caused by a backflow from the combustion chamber due to compressor instability, transient flows, varying operating conditions and/or varying fuel properties. Because the metals or alloys used to form the venturi and premix chamber cannot withstand high temperatures for significant amount of time, damage can quickly occur to these structures in the presence of a flashback. The flashback can be arrested by increasing the airflow into the venturi and premix chamber.

Accordingly, there is a need for a control and method for increasing air flow to the injector 64 in the event of a flashback.

SUMMARY OF THE INVENTION

An object of the present invention is to provide for a control and method for arresting flashback in a gas turbine engine combustion system having a venturi for delivering a mixture of air and fuel to a combustion chamber and a valve for controlling the amount of air flowing to the venturi.

The present invention achieves this object by providing a flashback control system and method having a flashback detection routine, a valve position trim routine, and a reference flame temperature adjustment routine. The flashback detection routine detects a flashback in the venturi by comparing the temperature at the venturi to the temperature of the air entering the valve. The valve position trim routine receives this flashback signal and in response causes the valve to open until the flashback is arrested. Finally, to prevent the flashback from recurring, the reference flame temperature adjustment routine adjusts a reference flame temperature in the control system so as to prevent the valve from returning to the position at which the flashback occurred.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
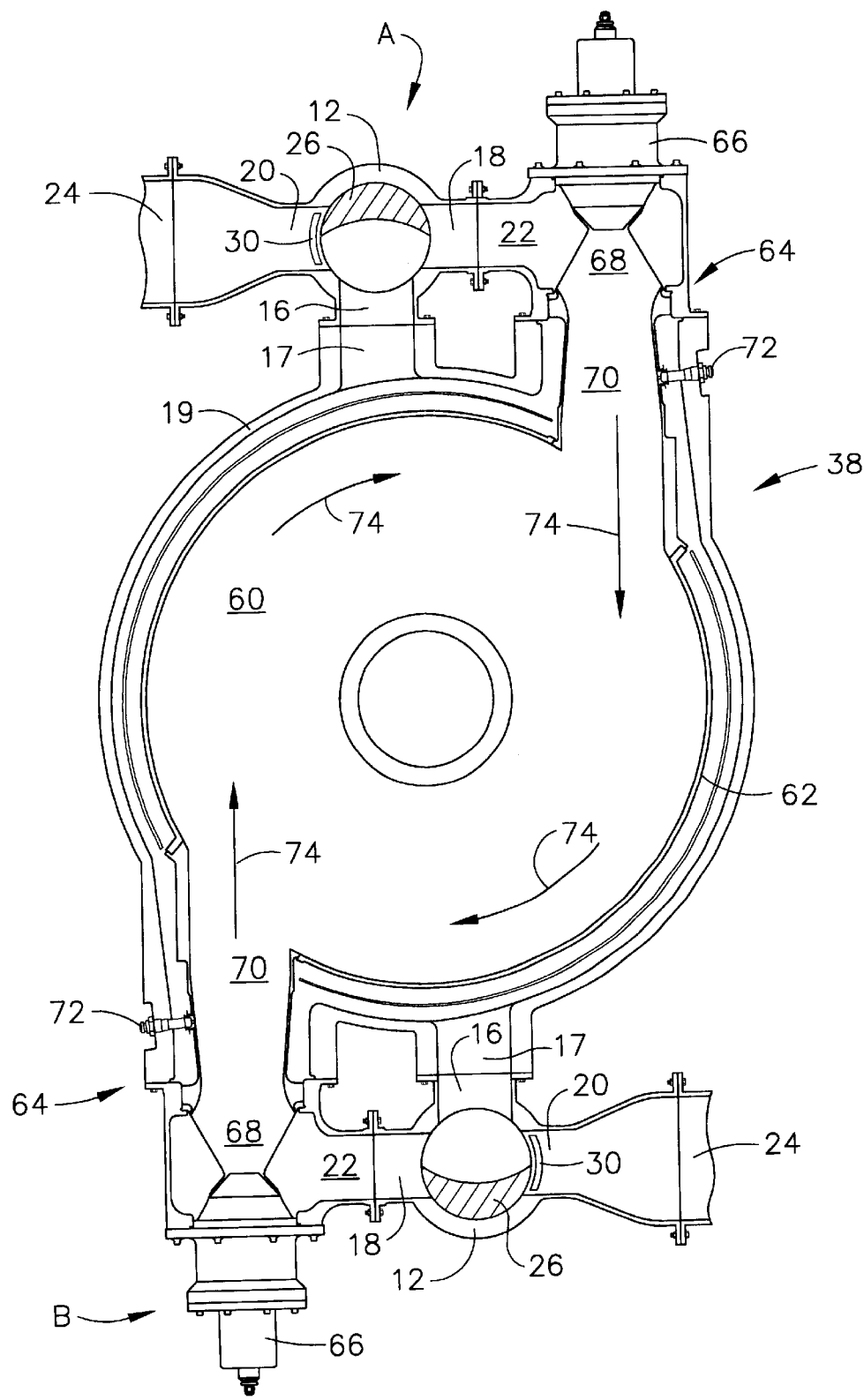
FIG. 1 is a cross-sectional view of a combustion system having two air bypass systems.

Referring to FIG. 1, in a manner familiar to those skilled in the art, at least one thermocouple is mounted on the wall of each of the venturis 70 to sense the local metal temperature. Alternatively, the thermocouple can be mounted in the venturis' gas stream. In either case, the thermocouples generate venturi temperature signals TvA and TvB for each venturi. These signals are received by the engine's electronic control unit. Thermocouples are also mounted in the inlets 16 to sense the air temperature entering the valves 12. These thermocouples generate signals TairA and TairB which are received by the engine's electronic control unit. Alternatively, a single thermocouple can be used to measure this air temperature.

The flashback control system and method contemplated by the present invention is comprised of a flashback detection routine 100, a valve position trim routine 120, and a reference flame temperature adjustment routine 140 and is programmed in a manner familiar to those skilled in the art into the electronic control unit of the gas turbine engine employing this system.

Figure 2:
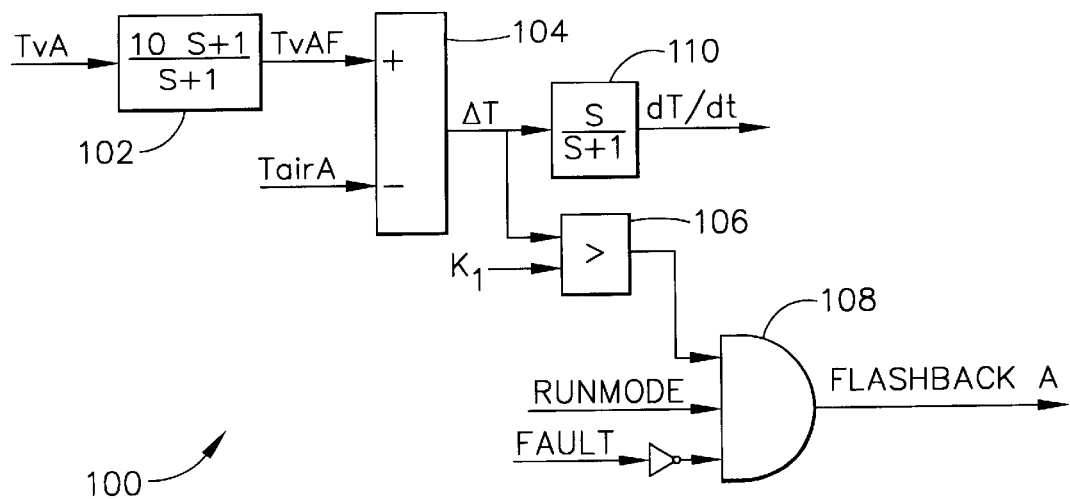
FIG. 2 is a control diagram of the flashback detection routine of the control system and method contemplated by the present invention.

Referring to FIG. 2, the flashback detection routine is generally denoted by reference numeral 100. The following description is made with respect to system A but is equally applicable to system B. The routine 100 includes a lead lag filter 102 that receives the TvA signal that modifies it to make it as fast as the TairA signal. A function block 104 receives both the TvA and TairA signal and generates a ΔT signal indicative of the difference between TvA and TairA. A comparator 106 compares the ΔT signal to a predetermined limit K1 which in the preferred embodiment is 150° F. If ΔT is greater than the predetermined limit and the engine is running as indicated by a run-mode signal and there is no fault signal from the venturi thermocouple, then function block 108 generates a FlashbackA signal indicating that a flashback has occurred in venturi A. The routine 100 also includes a derivative block 110 that takes the derivative over time of the ΔT signal generating a derivative signal dT/dt.

Figure 3:
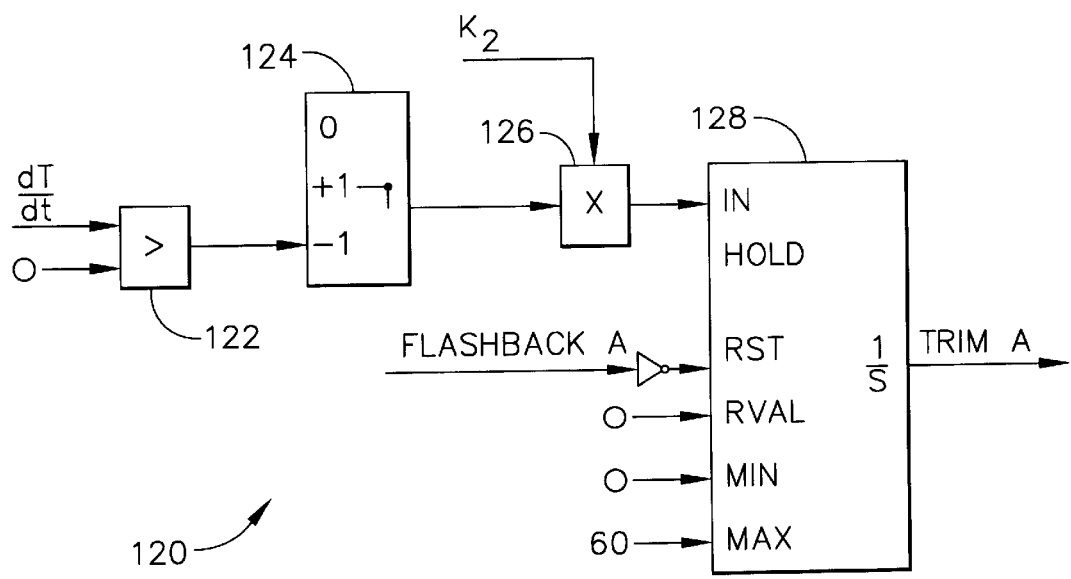
FIG. 3 is a control diagram of the valve position trim routine of the control system and method contemplated by the present invention.

Referring to FIG. 3, the valve position trim routine is generally denoted by reference numeral 120. Again, the following description is made with respect to combustion system A but is equally applicable to combustion system B. The routine 120 includes a comparator 122 and a switch 124. The comparator 122 receives the dT/dt signal and if this signal is greater than 0.0 causes the switch 124 to the +1 signal thereby enabling the routine 120. If dT/dt is not greater than 0.0, then switch 124 moves to the zero signal essentially disabling the remainder of the routine. With a +1 signal from switch 124, a multiplier 126 multiplies the +1 signal by a predetermined constant K2. The K2 constant is preselected and is the rate that the valve 12 is to be opened. In the preferred embodiment, K2 is 0.5 degrees/second and is the same for both the valve in system A and the valve in system B. An integrator 128 integrates the K2 signal to generate a TrimA signal in degrees for valve 12 of system A. The integrator 128 is a conventional integrator and has a reset input (RST) that resets the TrimA signal to 0.0, the reset value (RVAL), if a flashback is not detected. The integrator 128 also includes maximum and minimum limits on the TrimA signal of 60 degrees and 0.0 degrees respectively.

Figure 4:
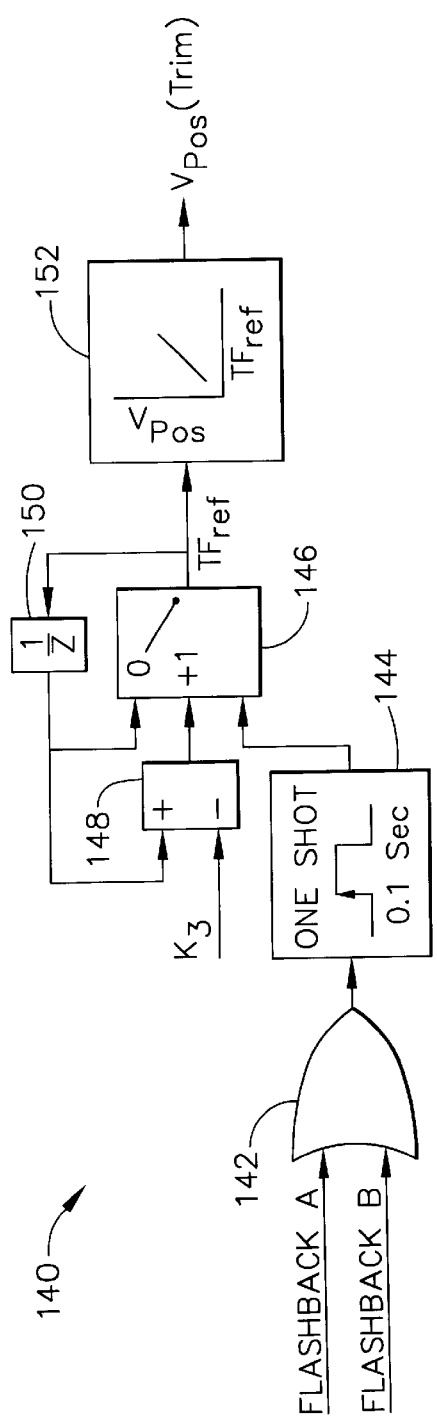
FIG. 4 is a control diagram of the reference flame temperature adjustment routine of the control system and method contemplated by the present invention.

Referring to FIG. 4, the flame temperature adjustment routine is generally denoted by reference numeral 140. This routine includes a function block 142 and function block 144 which in combination operate as follows. If a flashback is sensed in either of system A or system B by function block 142, then function block 144 senses the transition from a false to a true state and sends a one time signal to switch 146 that latches to the +1 position. With the switch 146 in the +1 position, function block 148 generates a new flame temperature reference signal TFref by subtracting a predetermined constant K3 from a previously stored TFref signal. Flame temperature is the gas temperature in the combustor 60 and K3 is, in the preferred embodiment, 50° F. Function block 150 receives the new TFref signal and resets the switch 146 back to the 0 position. Function block 150 also resets the stored TFref signal with the new TFref signal. The TFref signal is an input to the flame temperature trim logic represented as function block 152. Function block 152 has logic that calculates the flame temperature in the combustor and generates a valve position trim signal, VPos(trim), to make the calculated flame temperature match the desired flame temperature (TFref).

Figure 5:
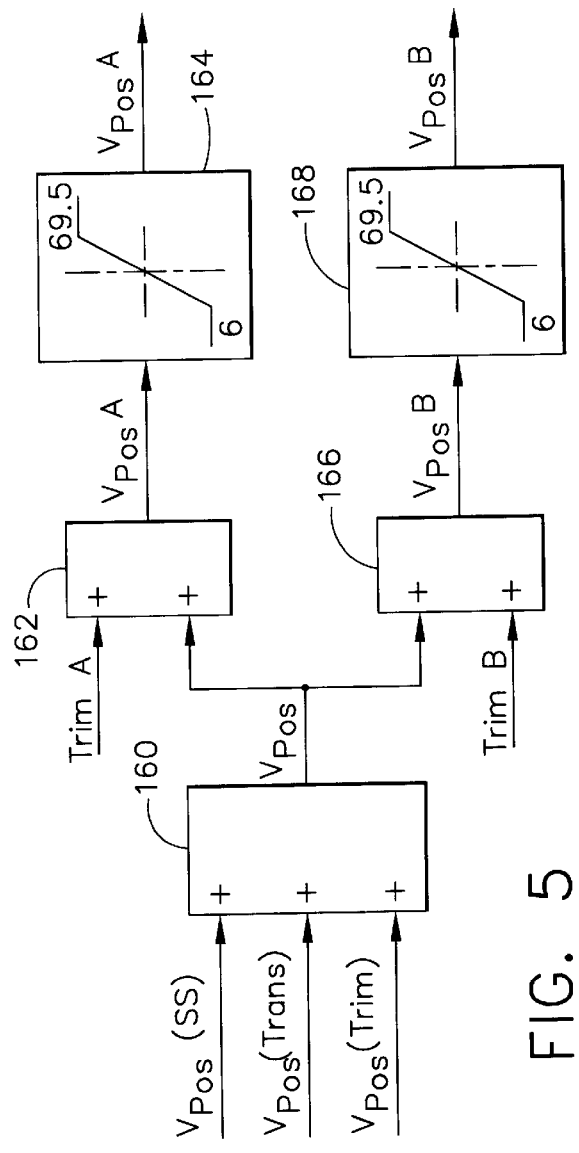
FIG. 5 is a control diagram of a portion of the control system that governs the operation of a gas turbine engine and employs the control system and method contemplated by the present invention.

FIG. 5 shows a portion of the logic programmed in the electronic control unit that controls the operation of the valve combustion systems A and B. This portion includes a function block 160 that receives a valve position signal for engine steady state operation, VPos(ss), and a valve position signal for engine transient operation, VPos(tran). In steady state operation, VPos(tran) is zeroed out. In transient operation, VPos(tran) is added to VPos(ss) to maintain proper combustion during fast changes in fuel flow. The function block 160 also receives the VPos (trim) signal and sums all signals it receives to generate a valve position signal VPos. A summer 162 adds the VPos signal to the Trim A signal to generate a valve position signal for valve 12 of system A, VPosA. This signal is then processed through a limiter 164 that limits the signal between the maximum permissible open angle and minimum permissible open angle. In the preferred embodiment the maximum is 69.5 degrees and the minimum is 6 degrees. For controllability of the valve, these limits are selected so that the valve never reaches its physical maximum open position or minimum open position. Similarly, a summer 166 adds the VPos signal to the TrimB signal to generate a valve position signal for the valve 12 in system B, VPosB. This signal is processed through a limiter 168 that limits the signal between the maximum permissible open angle and minimum permissible open angle. In the preferred embodiment the maximum is 69.5 degrees and the minimum is 6 degrees.

In operation, upon the indication that a flashback is occurring, the valve 12 in the combustion system A or B in which the flashback is occurring is ramped open at the rate of 0.5 degrees/second. Opening the valve 12 allows more air to flow to the venturi in which the flashback is occurring essentially pushing the flashback flame back into the combustion chamber. Once the flashback is arrested, the opening of the valve stops. When the flashback is completely extinguished, the flashback trim, TrimA or TrimB, is forced back to zero. The fame temperature adjustment routine reduces the reference flame temperature by 50° F. each time a flashback is detected which in turn causes the valves 12 to move to a more open position. This prevents the valves from returning the position in which the flashback occurred.

Though the preferred embodiment has been described with respect to an injector having a fuel nozzle 66, a venturi 70, and a premix chamber 68, the subject invention can also be used with other types of injectors. One example of such an injector is swirl based premixers in which the incoming air is swirled and fuel is generally, but not necessarily, added in the region of the swirl vanes. The swirl system may have counter-rotating swirlers and fuel may be added upstream or downstream of the air swirling vanes. Included in this class of premixers are swirl based premixers in which the swirl is induced by tangential slots rather than vanes. Another type of injector in which the present invention may be used are multi-point injector systems in which the incoming air passages are provided with many gas injection points typically through multi-holed vanes or arms.

Various other modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A method for arresting flashback in a gas turbine engine combustion system having an injector for delivering a mixture of air and fuel to a combustion chamber and a valve for controlling the amount of air flowing to the injector comprising the steps of:
   a) receiving a first signal indicative of the temperature of the injector;
   b) receiving a second signal indicative of air temperature entering said valve;
   c) calculating the difference between said first and second signal;
   d) generating a third signal indicative of a flashback occurring in said injector if said difference is greater than a predetermined amount; and
   e) opening said valve until said flashback is no longer detected.

2. The method of claim 1 wherein step (e) further comprises the step of determining if said difference is changing over time and if so generating a fourth signal that causes said valve to open at a predetermined rate.

3. The method of claim 2 wherein said determining step includes the following steps:

taking the derivative of said difference and comparing it to 0.0;

if the derivative is greater than 0.0, integrating at the predetermined rate to generate said fourth signal.

4. The method of claim 3 further comprising limiting said fourth signal between a predetermined maximum and minimum.

5. The method of claim 1 wherein step (d) further includes the steps of sensing that the engine is running and that an injector thermocouple is functioning before generating said third signal.

6. The method of claim 1 further comprising a method for preventing flashback from recurring, said prevention method comprising the steps of receiving said third signal and in response thereto reducing by a predetermined amount a flame temperature reference signal.

7. The method of claim 6 wherein said flame temperature reference signal is only reduced once each time said third signal is received.

8. The method of claim 7 further comprising storing said reduced flame temperature reference signal for further reduction the next time said third signal is received.

9. The method of claim 1 wherein said injector includes a fuel nozzle, a venturi, and a premix chamber.

10. The method of claim 9 wherein said injector temperature is the temperature of the venturi.

11. A system for arresting flashback in a gas turbine engine combustion system having an injector for delivering a mixture of air and fuel to a combustion chamber and a valve for controlling the amount of air flowing to the injector comprising the steps of:

a first temperature sensor mounted to said injector;

a second temperature sensor mounted upstream of said valve;

means for calculating the difference between said first and second temperatures;

means for indicating that a flashback is occurring in said injector in response to said temperature difference being greater than a predetermined amount; and means for opening said valve in response to said flashback indicating means until said flashback is no longer detected.

12. The system of claim 11 wherein said opening means further comprises means for determining if said temperature difference is changing over time and if so causing said valve to open at a predetermined rate.

13. The system of claim 12 wherein determining means comprises means for taking the derivative of said temperature difference and comparing the derivative to 0.0 and means for integrating at the predetermined if the derivative is greater than 0.0.

14. The system of claim 13 further comprising means for limiting the opening of said valve between a predetermined maximum and minimum.

15. The system of claim 11 further including means for sensing that the engine is running and means for sensing if said first sensor is functioning properly.

16. The system of claim 11 further comprising a means for preventing flashback from recurring.

17. The system of claim 11 wherein said injector includes a fuel nozzle, a venturi, and a premix chamber.

18. The system of claim 17 wherein said first sensor is mounted in said venturi.

* * * * *